United States Patent [19]
Bahl et al.

[11] Patent Number: 5,585,561
[45] Date of Patent: Dec. 17, 1996

[54] ROTATION RATE SENSOR WITH CLOSED ENDED TUNING FORK

[75] Inventors: Suneet Bahl, Walnut Creek; Robert H. Moore, Antioch, both of Calif.

[73] Assignee: New S.D., Inc., Concord, Calif.

[21] Appl. No.: 289,319

[22] Filed: Aug. 11, 1994

[51] Int. Cl.⁶ .................................................. G01P 15/10
[52] U.S. Cl. ........................................................ 73/504.16
[58] Field of Search ....................... 73/505, 504, 517 AV, 73/504.02, 504.12, 504.15, 504.16; 310/346, 370

[56] References Cited

U.S. PATENT DOCUMENTS

| Re. 32,931 | 5/1989 | Staudte | 73/505 |
|---|---|---|---|
| 3,697,789 | 10/1972 | Kato et al. | 310/334 |
| 4,538,461 | 9/1985 | Juptner et al. | 73/505 |
| 4,628,734 | 12/1986 | Watson | 73/504.16 |
| 4,654,663 | 3/1987 | Alsenz et al. | 73/505 |
| 4,742,260 | 5/1988 | Shimizu et al. | 310/323 |
| 4,930,351 | 6/1990 | Macy | 73/504.16 |

FOREIGN PATENT DOCUMENTS

| 2249174 | 4/1992 | United Kingdom | 73/505 |
|---|---|---|---|
| 2251688 | 7/1992 | United Kingdom | 73/504 |

*Primary Examiner*—Christine K. Oda
*Attorney, Agent, or Firm*—Flehr, Hohbach, Test, Albritton & Herbert

[57] ABSTRACT

A rotation rate sensor that includes a closed-ended tuning fork which has a drive end base, a pickup end base, and a pair of tines. Each of the tines has a drive end and a pickup end with the drive ends of the tines being joined to the drive end base and the pickup ends of the tines being joined to the pickup end base. The rotation rate sensor also includes a drive circuit for generating a drive signal and drive electrodes disposed on each of the tines for applying the drive signal to the tines. The drive signal causes drive mode vibration of the tines. The drive mode vibration changes orientation when the tuning fork is rotated and causes pickup mode vibration of the tines. The rotation rate sensor further includes pickup electrodes disposed on each of the tines for picking up a pickup signal corresponding to the pickup mode vibration of the tines and a pickup circuit which is responsive to the pickup signal for generating a rate signal corresponding to the rate of rotation of the tuning fork.

12 Claims, 8 Drawing Sheets

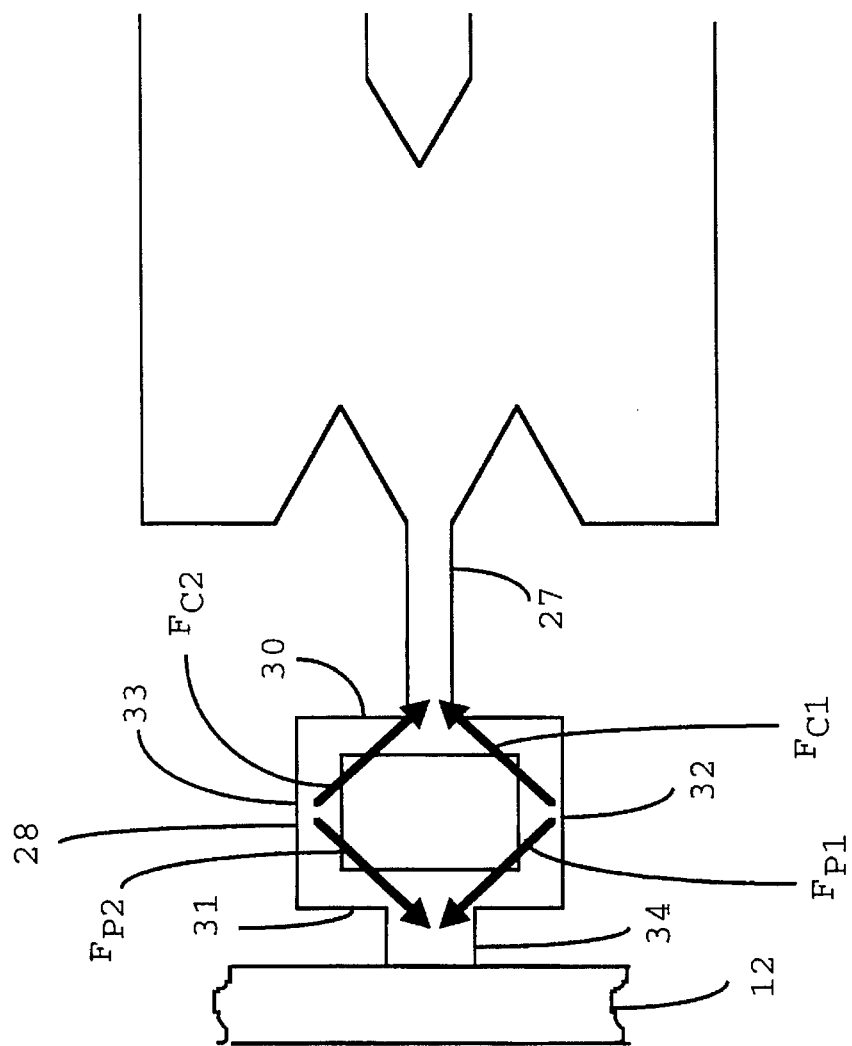
FIGURE 4
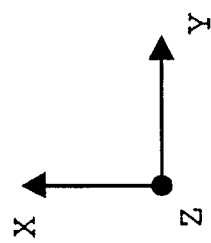

ROTATION RATE SENSOR WITH CLOSED ENDED TUNING FORK

FIELD OF THE INVENTION

The present invention relates generally to rotation rate sensors. Specifically, it pertains to rotation rate sensors with closed-ended dual tine tuning forks.

BACKGROUND OF THE INVENTION

Conventional rotation rate sensors typically employ double open ended (or H-shaped) tuning forks or single open ended tuning forks for sensing rotation. There are however a number of problems associated with these types of tuning forks.

Conventional open ended tuning forks have a complex structure in order to mechanically isolate them from the housing of the rotation rate sensor. This makes the associated manufacturing process complex and time consuming. Moreover, the complexity of the structure also increases the size of these tuning forks which in turn affects the number of tuning forks which can be produced per wafer of piezoelectric material.

Moreover, conventional open-ended tuning forks are mounted to the housing of the rotation rate sensor in such a way that strains are imparted on the tuning fork as the ambient temperature varies. These strains are due to the mismatch in coefficients of thermal expansion between the housing material and the piezoelectric material of the tuning fork and cause the drive mode and pickup mode vibration frequencies of the tuning fork to vary substantially from the desired frequencies of these modes.

Additionally, conventional open ended tuning forks have numerous vibrational modes below the drive and pickup modes. These vibrational modes can be easily excited by external vibrations and therefore affect the performance of the rotation rate sensor.

SUMMARY OF THE INVENTION

The foregoing problems are solved by a rotation rate sensor in accordance with the present invention. The rotation rate sensor includes a closed-ended tuning fork which has a drive end base, a pickup end base, and a pair of tines. Each of the tines has a drive end and a pickup end with the drive ends of the tines being integrally joined or connected to the drive end base and the pickup ends of the tines being integrally joined or connected to the pickup end base. The rotation rate sensor also includes a drive circuit for generating a drive signal and a plurality of drive electrodes disposed on the tines for applying the drive signal to the tines. The drive signal causes drive mode vibration of the tines. The drive mode vibration changes orientation when the tuning fork is rotated and causes pickup mode vibration of the tines. The rotation rate sensor further includes means for providing a pickup signal corresponding to the pickup mode vibration of the tines. It also includes a pickup circuit which is responsive to the pickup signal for generating a rate signal corresponding to the rate of rotation of the tuning fork.

BRIEF DESCRIPTION OF THE INVENTION

Figure 2:
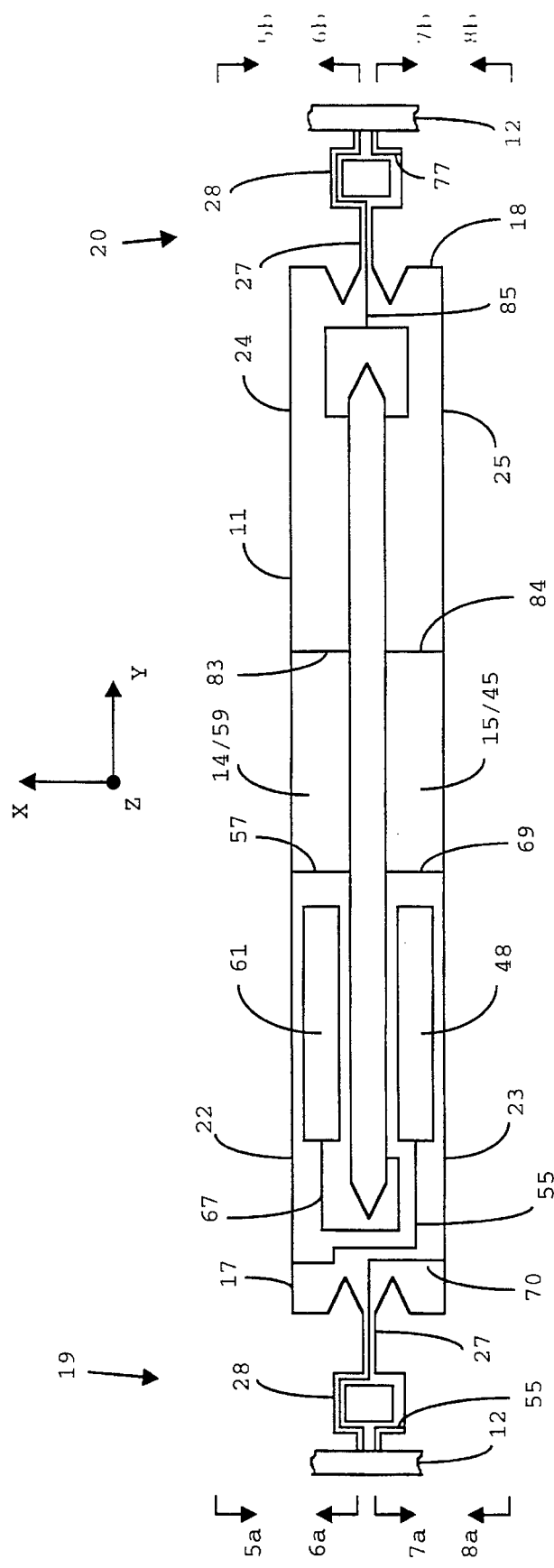
FIG. 2 is a top view of the closed-ended tuning fork employed by the rotation rate sensor of FIG. 1.
Figure 3:
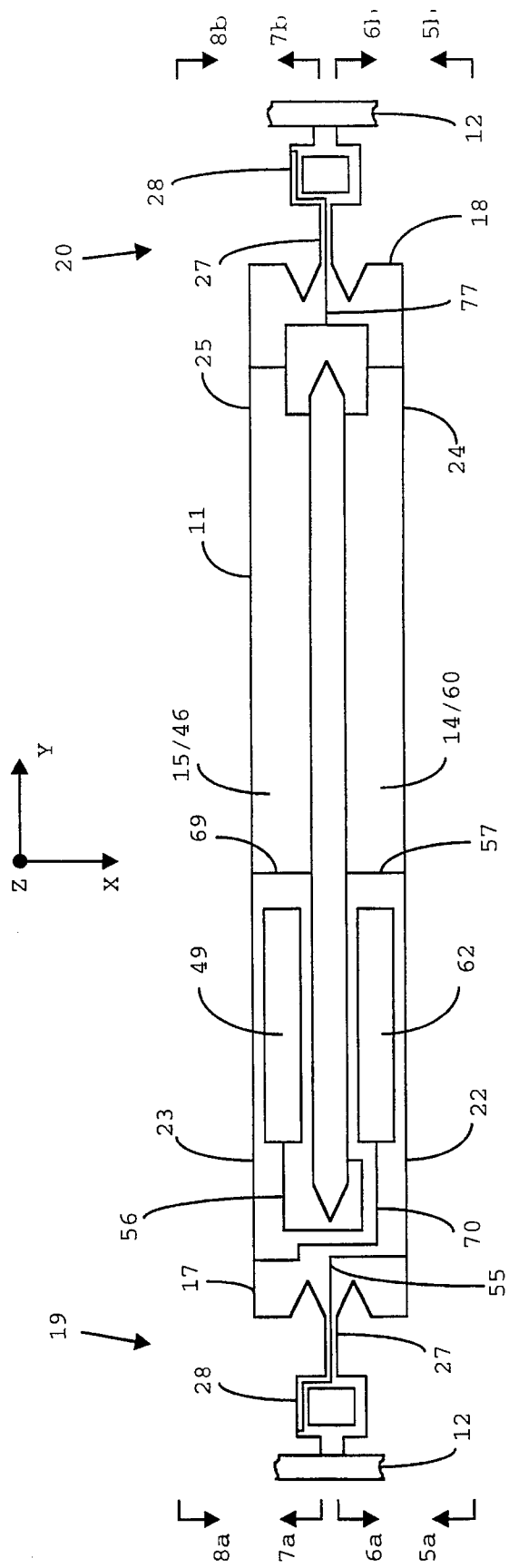
FIG. 3 is a bottom view of the closed-ended tuning fork of FIG. 2.

FIG. 4 provides an illustration of the temperature related pulling forces and counteracting forces distributed over the gimbals of the tuning fork of FIGS. 2 and 3.

Figure 5:
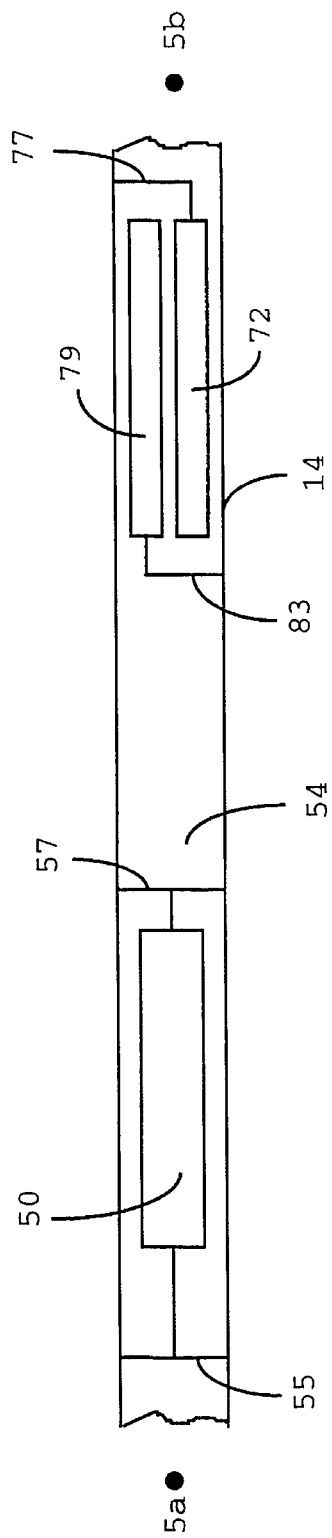

FIG. 5 is an exterior side view of the tuning fork of FIGS. 2 and 3 along the line 5a–5b.

Figure 6:
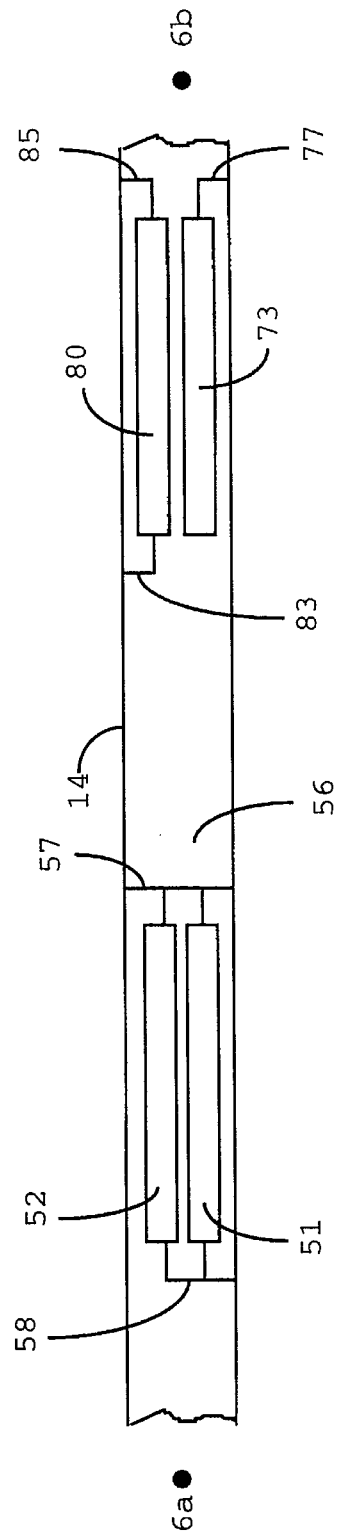

FIG. 6 is an interior side view of the tuning fork of FIGS. 2 and 3 along the line 6a–6b.

Figure 7:
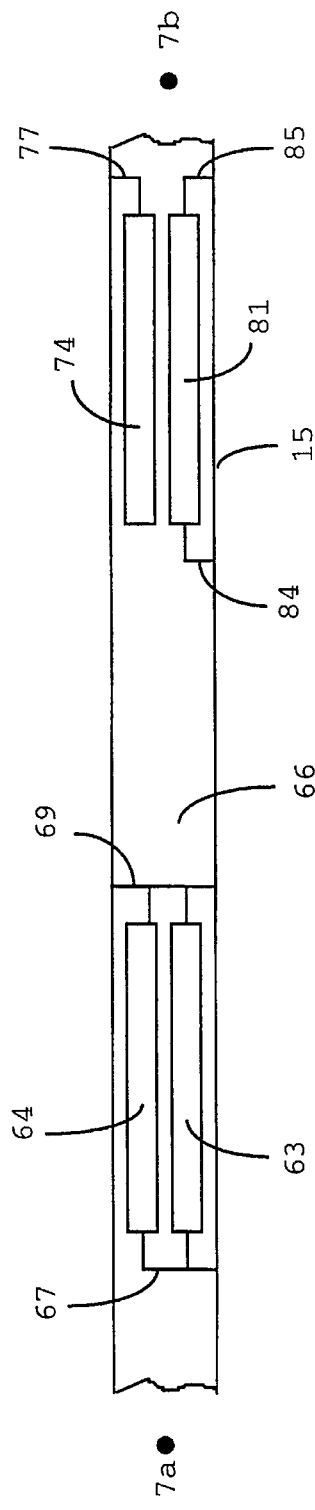

FIG. 7 is an interior side view of the tuning fork of FIGS. 2 and 3 along the line 7a–7b.

Figure 8:
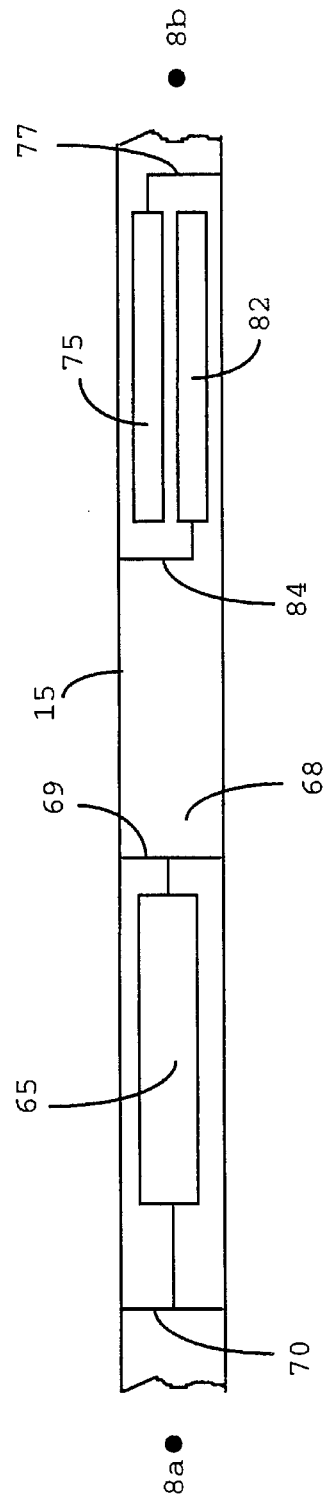

FIG. 8 is an interior side view of the tuning fork of FIGS. 2 and 3 along the line 8a–8b.

Figure 9:
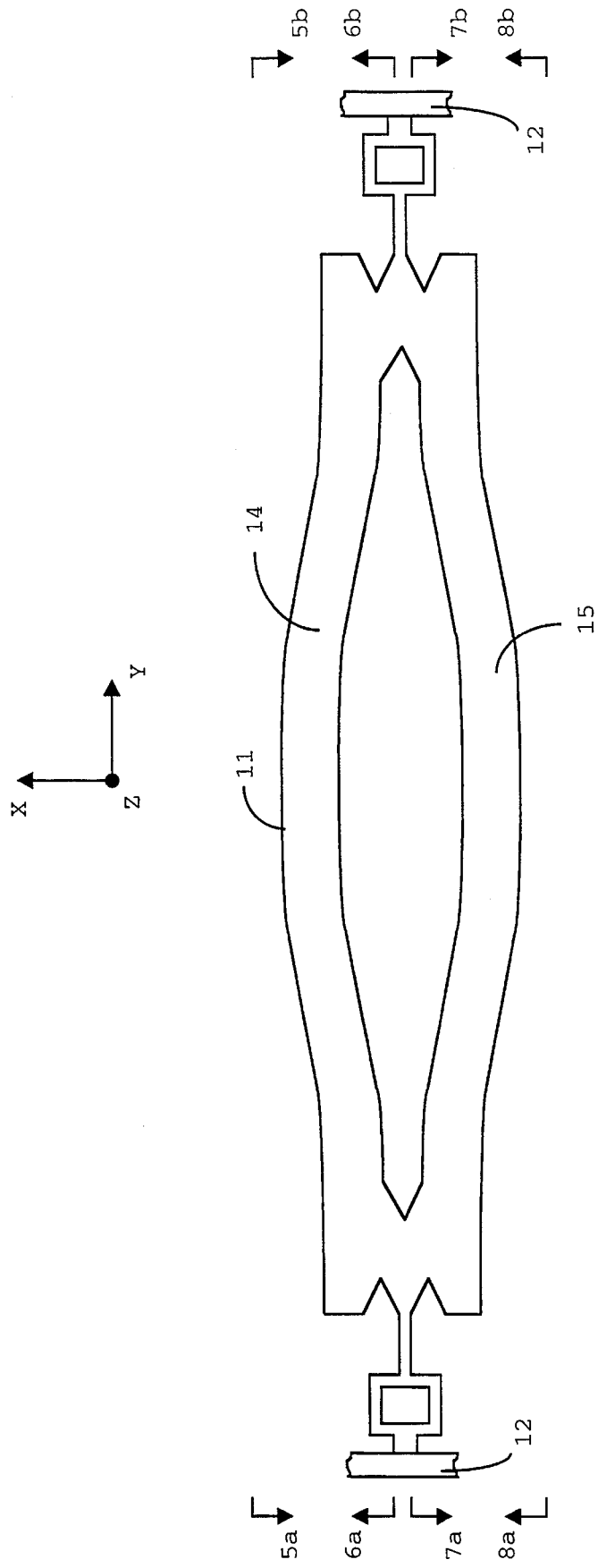

FIG. 9 provides an illustration of the shape of the drive mode vibration of the tuning fork of FIGS. 2 and 3.

Figure 10:
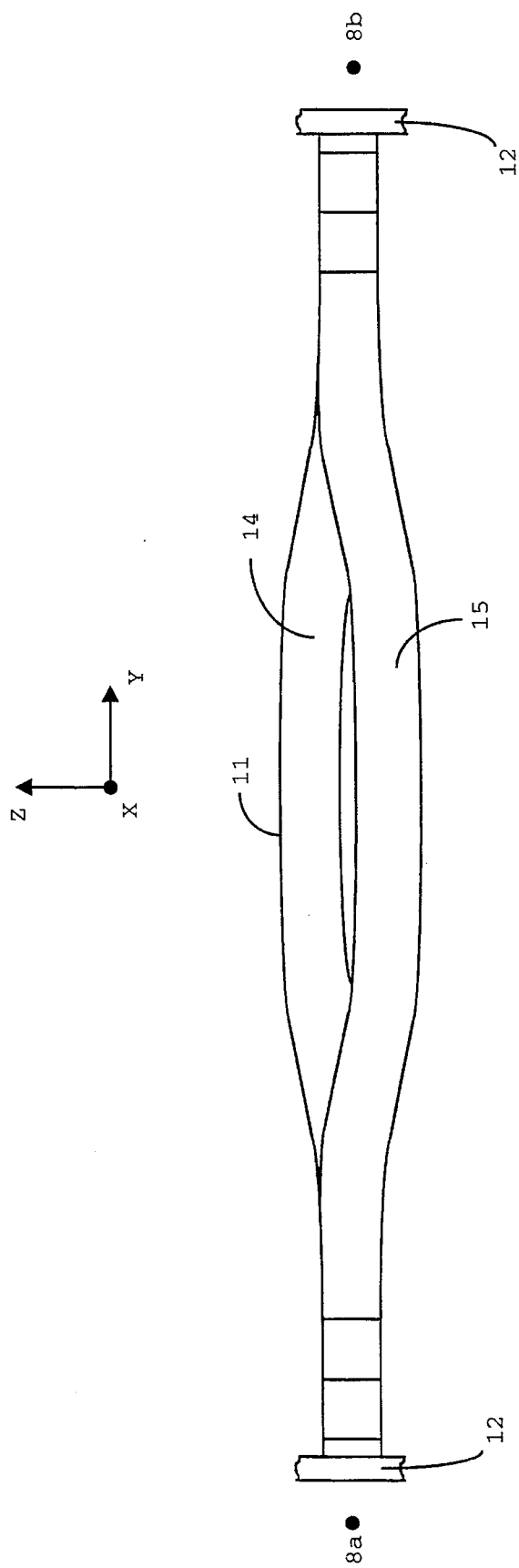

FIG. 10 provides an illustration of the shape of the pickup mode vibration of the tuning fork of FIGS. 2 and 3.

DETAILED DESCRIPTION OF THE INVENTION

Figure 1:
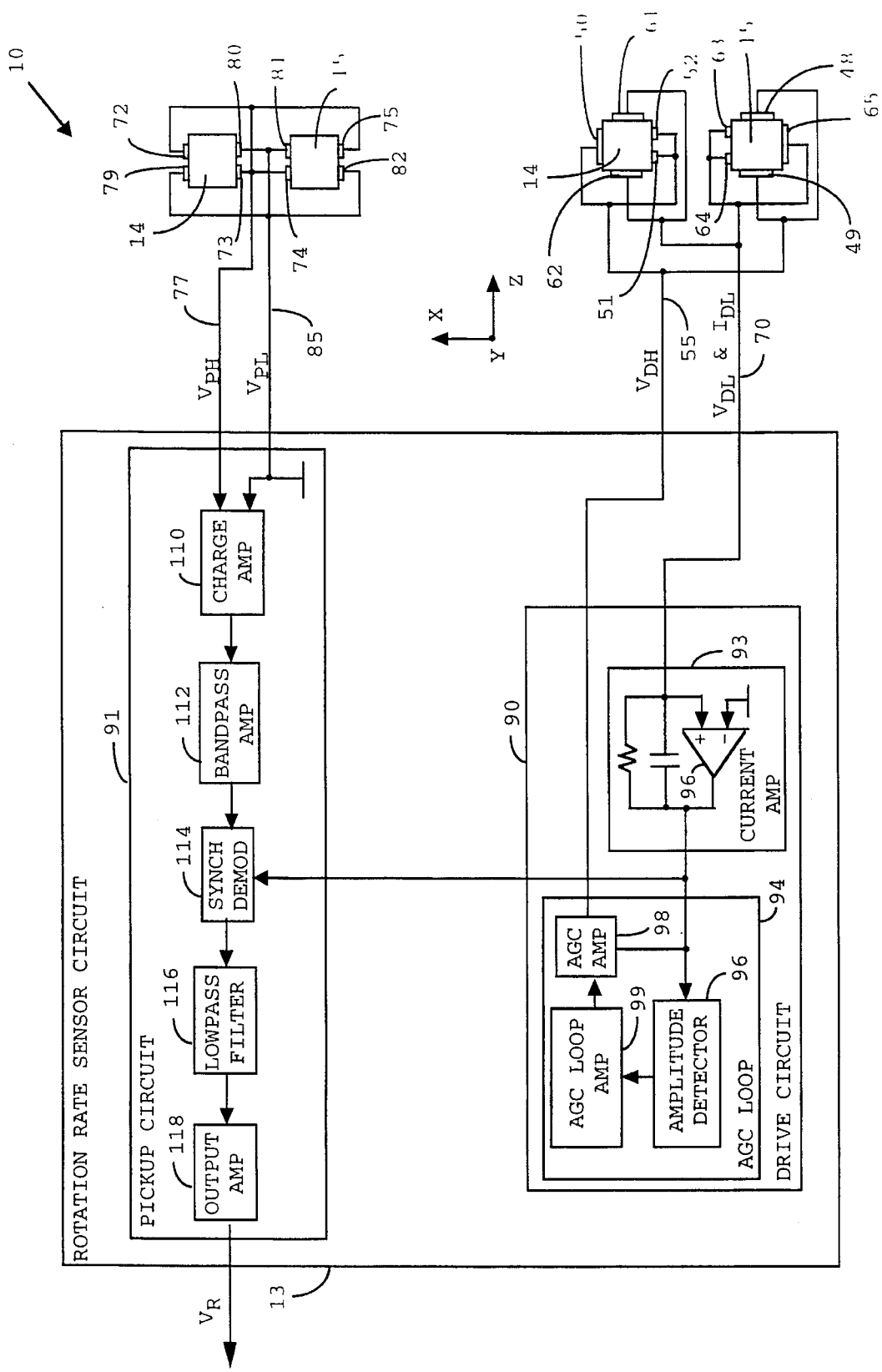
FIG. 1 is a diagram of a rotation rate sensor having a closed-ended tuning fork in accordance with the present invention.

FIG. 1 shows a rotation rate sensor 10 which includes a closed-ended dual tine tuning fork 11. Referring to FIGS. 2 and 3, the tuning fork 11 is etched or otherwise formed (e.g., laser cut) from a single crystal of a piezoelectric material such as quartz. The orientation of the tuning fork 11 is defined by the X, Y, and Z axes. These axes correspond to the alignment of the molecular structure of the crystal, and in the embodiments of the invention, tuning fork 11 is oriented in the XY plane.

Tuning fork 11 includes a pair of tines 14 and 15, a drive end base 17, a pickup end base 18, a drive end suspension system 19, and a pickup end suspension system 20.

The tines 14 and 15 respectively have drive ends 22 and 23 and pickup ends 24 and 25. The drive ends 22 and 23 are integrally joined or connected to the drive end base 17 while the pickup ends 24 and 25 are integrally joined or connected to the pickup end base 18.

The drive and pickup end suspension systems 19 and 20 are integrally joined or connected to the drive and pickup end bases 17 and 18, respectively, and are affixed to the housing 12. Thus, the suspension systems 19 and 20 together suspendedly mount the tuning fork 11 to the housing 12.

The drive and pickup end suspension systems 19 and 20 each include a thin bridge 27 and a gimbal 28. Each bridge 27 is integrally and substantially perpendicularly joined or connected to one of the gimbals 28 and to one of the drive and pickup end bases 17 and 18.

Referring to FIG. 4, each gimbal 28 includes cross bars 30 and 31, side bars 32 and 33 and a mount 34. The cross bar 30 is integrally and substantially perpendicularly joined or connected to the bridge 27. The side bars 32 and 33 are integrally and substantially perpendicularly joined or connected to the cross bars 30 and 31. The mount 34 is integrally and substantially perpendicularly joined or connected to the cross bar 31 and is affixed to the housing 12.

The gimbals 28 serve to reduce strains imparted on the tuning fork 11 when the ambient temperature changes. This occurs in the following manner.

Referring again to FIGS. 2 and 3, when temperature changes, the suspension systems 19 and 20 are respectively subjected to stress at the portion of the housing 12 to which they are fixed. This is due to the mismatch in coefficients of thermal expansion between the material of the housing 12 and the piezoelectric material of the tuning fork 11. However, the resulting pulling or pushing forces and the forces counteracting the pulling or pushing forces are isolated on and distributed over the gimbals 28.

Specifically, referring to FIG. 4, pulling forces experienced by the drive and pickup end suspension systems 19 and 20 are effectively distributed over the gimbals 28 into two components $F_{p1}$ and $F_{p2}$. The first component $F_{p1}$ extends from the side bar 32 to the point where the mount 34 and the cross bar 31 are joined. The second component $F_{p2}$ extends from the side bar 33 also to the point where the mount 34 and the cross bar 31 are joined.

Moreover, the force counteracting the pulling forces experienced by the drive and pickup end suspension systems 19 and 20 are also effectively distributed over the gimbals 28 into two components $F_{c1}$ and $F_{c2}$. The first component $F_{c1}$ extends from the side bar 32 to the point where the bridge 27 and the cross bar 30 are joined. The second component $F_{c2}$ extends from the side bar 33 also to the point where the bridge 27 and the cross bar 30 are joined.

Referring again to FIGS. 2 and 3, since the temperature related strains are isolated on the gimbals, the strain on the drive end and pickup end bridges 27 is effectively eliminated. As a result, the tuning fork 11 is isolated from temperature boundary conditions and the drive, pickup, and other vibration modes of the tuning fork remain substantially at their desired resonant frequencies during changes in ambient temperature.

Furthermore, all of the piezoelectric elements of the tuning fork 11 (i.e, tines 14 and 15, end bases 17 and 18, and suspension systems 19 and 20) have the same thickness. Since this thickness is the thickness of the wafer of piezoelectric material from which the tuning fork 11 is formed, the process for forming the tuning fork 11 is greatly simplified. This substantially speeds up the processing time and reduces the cost of forming tuning fork 11.

Respectively located on the top and bottom surfaces 45 and 46 of tine 15 are two drive high electrodes 48 and 49. And, as shown in FIG. 5, located on the exterior side surface 54 of tine 14 is the drive high electrode 50. The electrodes 48 and 50 are connected together by the lead 55. Furthermore, as shown in FIG. 6, located on the interior side surface 56 of tine 14 are the parallel drive high electrodes 51 and 52. The electrodes 49, 51, and 52 are connected together by the lead 58 while electrodes 50-52 are connected together by lead 57. Thus, all of the drive high electrodes 48–52 are coupled together and to the lead 55.

Referring again to FIGS. 2 and 3, respectively located on the top and bottom surfaces 59 and 60 of tine 14 are two drive low electrodes 61 and 62. Turning to FIG. 7, located on the interior side surface 66 of tine 15 are the parallel drive low electrodes 63 and 64. The electrodes 61, 63, and 64 are connected together by the lead 67.

Furthermore, as shown in FIG. 8, located on the exterior side surface 68 of tine 15 is the drive low electrode 65. The electrodes 62 and 65 are connected together by the lead 70 while electrodes 63–65 are connected together by the lead 69. Thus, all of the drive low electrodes 61–65 are coupled together and to the lead 70.

Furthermore, turning to FIGS. 5 and 6, the two pickup high electrodes 72 and 73 are respectively located on the exterior and interior side surfaces 54 and 56 of tine 14. As shown in FIGS. 7 and 8, the other two pickup high electrodes 74 and 75 are respectively located on the interior and exterior side surfaces 66 and 68 of tine 15. The electrodes 72–75 are connected together by the lead 77.

Referring again to FIGS. 5 and 6, the two pickup low electrodes 79 and 80 are respectively located on the exterior and interior side surfaces 54 and 56 of pickup tine 14. The electrodes 79 and 80 are connected together by the lead 83. And, as shown in FIGS. 7 and 8, the other two pickup low electrodes 81 and 82 are respectively located on the interior and exterior side surfaces 66 and 68 of pickup tine 15. The electrodes 81 and 82 are connected together by the lead 84. Thus, the electrodes 7982 are all coupled together and to the lead 85.

As just described, on the interior side surface 56 of tine 14 are the two parallel drive high electrodes 51 and 52 and the parallel pickup high and pickup low electrodes 73 and 80. And, on the interior side surface 66 of tine 15 are the two parallel drive low electrodes 63 and 64 and the parallel pickup high and pickup low electrodes 74 and 81.

This type of split electrode configuration occurs because the close spacing of the tines 14 and 15 allows them to be used to create the necessary shadowing to produce the split electrode configuration during the metalization process. Thus, tuning fork 11 overcomes any metalization difficulties by design and does not require any other structural features or complication of tooling.

Referring back to FIG. 1, the rotation rate sensor circuit 13 of the rotation rate sensor 10 includes a drive circuit 90 and a pickup circuit 91.

The drive circuit 90 includes a current amplifier 93 and an automatic gain control (AGC) loop 94. As is well known in the art, the AGC amplifier 98 of the AGC loop 94 produces an oscillating drive high signal $V_{DH}$. The drive high signal $V_{DH}$ is provided to the lead 55 and applied to the tines 14 and 15 by the drive high electrodes 48–52.

Furthermore, the current amplifier 93 receives the current signal $I_{DL}$ on lead 70 picked up by the drive low electrodes 61–65 from the tines 14 and 15. At the same time, the current amplifier 93 produces the drive low signal $V_{DL}$ in the form of a virtual ground on the lead 70 since the positive input of the operational amplifier 97 is grounded. The drive low signal $V_{DL}$ is provided to the electrodes 61–65 which apply it to the tines 14 and 15.

The applied drive high signal $V_{DH}$ and the drive low signal $V_{DL}$ cause strains in the piezoelectric material of the tines 14 and 15. These strains induce the tines 14 and 15 to vibrate generally in opposite directions in the XY plane at their resonant frequency in the drive mode, as shown in FIG. 9.

Referring back to FIG. 1, the drive mode vibration of the tines 14 and 15 cause oscillating electric field gradients to be created in the tines 14 and 15. The composite current signal $I_{DL}$ picked up from the tines 14 and 15 with the drive low electrodes 61–65 due to the oscillating field gradients is provided to the current amplifier 93, as was indicated earlier. In response, the current amplifier 93 amplifies the current signal $I_{DL}$ and outputs it to the AGC loop 94. The amplified current signal is proportional to the amplitude of vibration of the tines 14 and 15 in the drive mode.

The amplified current signal is then provided to the amplitude detector 96 and the AGC amplifier 98 of the AGC loop 94. The amplitude detector 96 rectifies the current signal and provides the rectified output to the AGC loop amplifier 99. In response, the AGC loop amplifier 99 outputs a signal which controls the AGC amplifier 98 to generate the drive high signal $V_{DH}$ so as to keep the amplitude of vibration of the tines 14 and 15 fixed. The voltage amplitude of the drive high signal $V_{DH}$ is therefore proportional to the amplitude of the vibration of the tines 14 and 15.

When tuning fork 11 is subjected to an inertial rotation about the Y axis, the tines 14 and 15 have a component of vibration due to this inertial rotation. In this case, the bridges 27 of the suspension systems 19 and 20 enable the tines 14 and 15 to experience generally equal but opposing Coriolis accelerations in planes parallel to the YZ plane. These time-varying Coriolis accelerations cause the drive mode vibration of the tines 14 and 15 to change orientation so that the tines 14 and 15 have vibrational components out of the XY plane and in planes parallel to the YZ plane at the resonant frequency of the drive mode. This is the pickup mode rotation induced vibration component of the tines 14 and 15 and is shown in FIG. 10. As a result, the Coriolis accelerations and displacements of the tines 14 and 15 in the planes parallel to the YZ plane are in phase with the velocity of the tines 14 and 15 in the XY plane and are linearly proportional to the inertial rotation about the Y axis.

Furthermore, partial vibration of the tines 14 and 15 in planes parallel to the YZ plane may be excited by the forced drive mode vibration of the tines 14 and 15. This partial vibration is known as the pickup mode quadrature vibration component of the tines 14 and 15 and is 90° out of phase (i.e., in quadrature) with the pickup mode rotation induced vibration component of the tines 14 and 15.

The quadrature vibration component may occur because tines 14 and 15 may not be perfectly mass balanced because of facets (i.e., unwanted material) left on the tines 14 and 15 from the etching process used in forming the tines 14 and 15. Moreover, the drive high electrodes 48–52 and the drive low electrodes 61–65 may not be perfectly aligned on the tines 14 and 15 which may also contribute to the quadrature vibration component.

As a result, quadrature creating accelerations and displacements of the tines 14 and 15 due to the factors just described exist in the planes parallel to the YZ plane. These accelerations and displacements of the tines 14 and 15 are (1) 90° out of phase (i.e., in quadrature) with the drive mode velocity of the tines 14 and 15 in the XY plane, and (2) 90° out of phase (i.e., in quadrature) with the displacement of the tines 14 and 15 in the YZ plane due to rotation of the tuning fork 11. Thus, as was stated earlier, the pickup mode quadrature vibration component of the tines 14 and 15 and is 90° out of phase (i.e., in quadrature) with the pickup mode rotation induced vibration component of the tines 14 and 15.

The pickup mode for rotation rate sensor 10 occurs anytime that the tines 14 and 15 vibrate in the planes parallel to the YZ plane at the same frequency as the drive mode vibration of these tines. Thus, the pickup mode involves both the quadrature vibration component and the rotation induced vibration component of the tines 14 and 15.

As shown in FIG. 1, a pickup low signal $V_{PL}$ in the form of a ground is provided by the pickup circuit 91 to the pickup low electrodes 79–82 via the lead 85. The pickup low signal $V_{PL}$ is applied to the tines 14 and 15 by the pickup low electrodes 79–82.

When the tines 14 and 15 vibrate in the pickup mode, strains are imposed on the piezoelectric material of the tines 14 and 15. These strains, together with the applied pickup low signal $V_{PL}$, cause oscillating electric field gradients to be generated in the tines 14 and 15.

In response, the pickup high electrodes 72–75 together pickup a pickup high signal $V_{PH}$ from the tines 14 and 15. The pickup high signal $V_{PH}$ represents the summed together time-varying strain-induced charge created in the pickup tines 14 and 15. Moreover, this signal has a rotation induced component that corresponds to the rotation induced vibration component of tines 14 and 15 and a quadrature component that corresponds to the quadrature vibration component of tines 14 and 15.

The pickup high signal $V_{PH}$ is provided to the pickup circuit 91 via the lead 77. The pickup circuit 91 includes a charge amplifier 110, a bandpass filter 112, a synchronous demodulator 114, a low pass filter 116, and an output amplifier 118.

The charge amplifier 110 receives the pickup high signal $V_{PH}$. In response, the charge amplifier 110 amplifies the signal and provides it to the bandpass filter/amplifier 112. The bandpass filter/amplifier 112 filters and amplifies this signal and provides it to the synchronous demodulator 114.

The synchronous demodulator 114 uses the signal output by the current amplifier 93 as a reference signal to remove or reject the quadrature component of the signal output by the bandpass filter/amplifier 112. As a result, it outputs a direct current (DC) rate signal that is proportional to the magnitude of the rotation induced component of the pickup high signal $V_{PH}$. Since the rotation induced component is proportional to the Coriolis accelerations experienced by the drive tines 14 and 15 and therefore proportional to the rate of rotation of the tuning fork 11, the DC rate signal output by the synchronous demodulator 114 is also proportional to the rate of rotation of the tuning fork 11.

The low pass filter 116 receives the DC rate signal from the synchronous demodulator 114. It removes any residual high frequency components and provides the filtered signal to the output amplifier 118.

The output amplifier 118 amplifies the filtered DC rate signal and outputs it as the output rate signal $V_R$. Since the output rate signal $V_R$ is proportional to the DC rate signal, the output rate signal $V_R$ is proportional to and represents the rate of rotation of the tuning fork 11.

One significant advantage to the employing the closed-ended tuning fork 11 in the rotation rate sensor 10 is that the tuning fork 11 is very insensitive to external vibrations. This insensitivity is due to the mechanical simplicity of the tuning fork 11. As a result, tuning fork 11 has a limited number of vibrational resonances in frequency ranges of practical interest.

For example, analysis reveals only two meachnical resonances below the drive natural frequency, the lowest typically having its resonance frequency greater than 40% of the drive mode natural frequency. Thus, if tuning fork 11 has a drive mode frequency of 12,500 Hz, its lowest frequency mode will be at or above 5,000 Hz, which is far above common externally applied vibrations of 2,000 Hz or less. This lack of low frequency modes means that tuning fork 11 will have negligible vibration sensitivity to typical applied vibration environments.

Another advantage provided by rotation rate sensor 10 is a low feedthrough (i.e., capacitive coupling of input to output) error. This is due to the placement of the drive electrodes 48–52 and 61–65 so that one end of each of these electrodes is located adjacent the drive ends 22 and 23 of the tines 14 and 15 and the placement of the pickup electrodes 72–75 and 79–82 so that one end of each of these electrodes is adjacent the pickup ends 24 and 25 of the tines 14 and 15. In other words, due to the separation of the drive electrodes 48–52 and 61–65 from the pickup electrodes 72–75 and 79–82, electrostatic field flux lines created with the drive electrodes 48–52 and 61–65 will not interfere with the pickup of the pickup high signal $V_{PH}$ by the pickup electrodes 72–75.

Lastly, the simplicity of the design of tuning fork 11 makes it very compact. As a result, the number of tuning forks 11 that can be produced per wafer of piezoelectric material is maximized.

While the present invention has been described with reference to a few specific embodiments, the description is illustrative of the invention and is not to be construed as limiting the invention. Furthermore, various modifications may occur to those skilled in the art without departing from the true spirit and scope of the invention as defined by the appended claims.

What is claimed is:

1. A closed-ended tuning fork comprising:

a pair of unframed tines;

a drive end base joined to a drive end of each of the tines; and a pickup end base joined to a pickup end of each of the tines;

drive end and pickup end suspension systems respectively joined to the drive end and pickup end bases for mounting the tuning fork to an external structure, each of the drive end and pickup end suspension systems including means for reducing temperature related strain on the tuning fork and a bridge joined to a corresponding one of the drive end and pickup end bases and to the strain reducing means;

the tines, the drive end and pickup end bases, and the drive end and pickup end suspension systems all being formed from a single crystal piezoelectric material.

2. A closed-ended tuning fork as recited in claim 1 wherein each of the strain reducing means includes a first cross bar, a mount joined to the first cross bar for mounting to the external structure, a second cross bar joined substantially perpendicular to a corresponding one of the bridges, side bars joined substantially perpendicular to the first and second cross bars.

3. A rotation rate sensor comprising:

a housing;

a closed-ended tuning fork housed by the housing and including a pair of unframed tines, a drive end base connected to a drive end of each of the tines, a pickup end base connected to a pickup end of each of the tines, and drive end and pickup end suspension systems respectively joined to the drive end and pickup end bases and affixed to the housing, each of the drive end and pickup end suspension systems including means affixed to the housing for reducing temperature related strain on the tuning fork and a bridge joined to a corresponding one of the drive end and pickup end bases and to the strain reducing means, the tines, the drive end and pickup end bases, and the drive end and pickup end suspension systems all being formed from a single crystal piezoelectric material;

a drive circuit for generating a drive signal;

a plurality of drive electrodes disposed on each of the tines at the drive end for applying the drive signal to the tines so as to induce drive mode vibration of the tines, the drive mode vibration changing orientation when the tuning fork is rotated at a rate of rotation and causing pickup mode vibration of the tines;

a plurality of pickup electrodes disposed on each of the tines at the pickup end for picking up a pickup signal corresponding to the pickup mode vibration of the tines; and a pickup circuit, responsive to the pickup signal, for generating a rate signal corresponding to the rate of rotation of the tuning fork.

4. A rotation rate sensor as recited in claim 3 wherein each of the strain reducing means includes a first cross bar, a mount joined to the first cross bar and affixed to the housing, a second cross bar joined substantially perpendicular to a corresponding one of the bridges, and side bars joined substantially perpendicular to the first and second cross bars.

5. A closed-ended tuning fork comprising:

a pair of tines;

a drive end base joined to a drive end of each of said tines; and a pickup end base joined to a pickup end of each of said tines.

drive end and pickup end suspension systems respectively joined to the drive end and pickup end bases for mounting the tuning fork to an external structure, each of the drive end and pickup end suspension systems including means for reducing temperature related strain on the tuning fork and a bridge joined to a corresponding one of the drive end and pickup end bases and to the strain reducing means.

6. A closed-ended tuning fork as recited in claim 5 wherein each of the strain reducing means includes a first cross bar, a mount joined to the first cross bar for mounting to the external structure, a second cross bar joined substantially perpendicular to a corresponding one of the bridges, and side bars joined substantially perpendicular to the first and second cross bars.

7. A closed-ended tuning fork as recited in claim 5 wherein the tines, the drive end and pickup end bases, and the drive end and pickup end suspension systems are all formed from a single crystal piezoelectric material.

8. A rotation rate sensor comprising:

a housing;

a closed-ended tuning fork housed by the housing and including a pair of tines, a drive end base connected to a drive end of each of the tines, a pickup end base connected to a pickup end of each of the tines, and drive end and pickup end suspension systems affixed to the housing and respectively connected to the drive end and pickup end bases, each of the drive end and pickup end suspension systems including means affixed to the housing for reducing temperature related strain on the tuning fork and a bridge joined to a corresponding one of the drive end and pickup end bases and to the strain reducing means;

a drive circuit for generating a drive signal;

a plurality of drive electrodes disposed on each of the tines for applying the drive signal to the tines so as to induce drive mode vibration of the tines, the drive mode vibration changing orientation when the tuning fork is rotated at a rate rotation and causing pickup mode vibration of the tines;

means for providing a pickup signal corresponding to the pickup mod vibration of the tines; and a pickup circuit, responsive to the pickup signal, for generating a rate sign corresponding to the rate of rotation of the tuning fork.

9. A rotation rate sensor as recited in claim 8 wherein each of the strain reducing means includes a first cross bar, a mount joined to the first cross bar and affixed to the housing, a second cross bar joined substantially perpendicular to a corresponding one of the bridges, and side bars joined substantially perpendicular to the first and second cross bars.

10. A rotation rate sensor as recited in claim 8 wherein the tines, the drive end and pickup end bases, and the drive end and pickup end suspension systems are all formed from a single crystal piezoelectric material.

11. A rotation rate sensor as recited in claim 10 wherein the tines are unframed.

12. A rotation rate sensor as recited in claim 11 wherein the drive electrodes disposed on each of the tines are disposed at the drive end and the means for providing the pickup signal includes a plurality of pickup electrodes disposed on each of the tines at the pickup end.

* * * * *